T. J. SLOAN.
Screw Threader.

No. 9,223.

Patented Aug. 24, 1852.

UNITED STATES PATENT OFFICE.

THOMAS J. SLOAN, OF NEW YORK, N. Y.

IMPROVEMENT IN THREADING POINTED WOOD-SCREWS.

Specification forming part of Letters Patent No. 9,223, dated August 24, 1852.

*To all whom it may concern:*

Be it known that I, THOMAS J. SLOAN, of New York city, New York, have invented a new and useful Improvement in Machines for Threading Pointed Wood-Screws; and I do hereby declare that the following is a full, clear, and exact description thereof, reference being had to the accompanying drawings, making part of this specification, in which—

Figure 1:
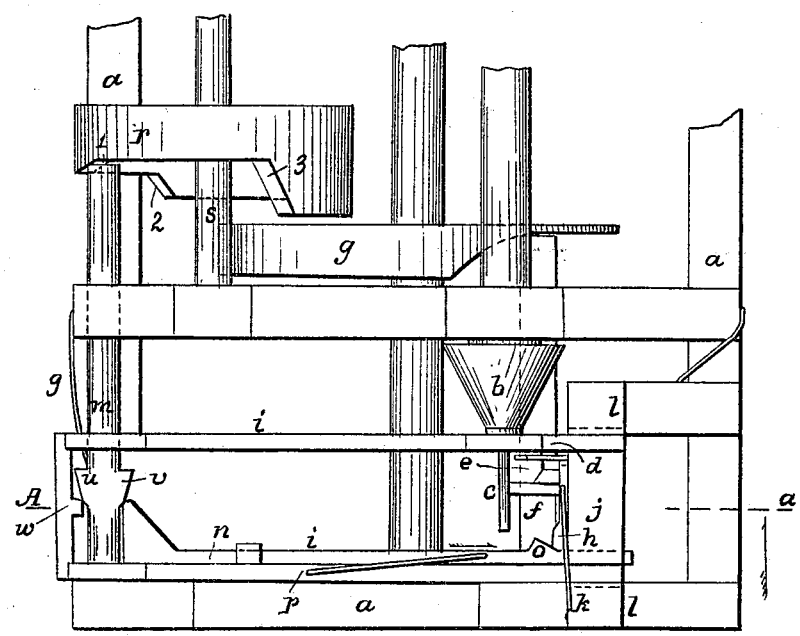
Figure 2:
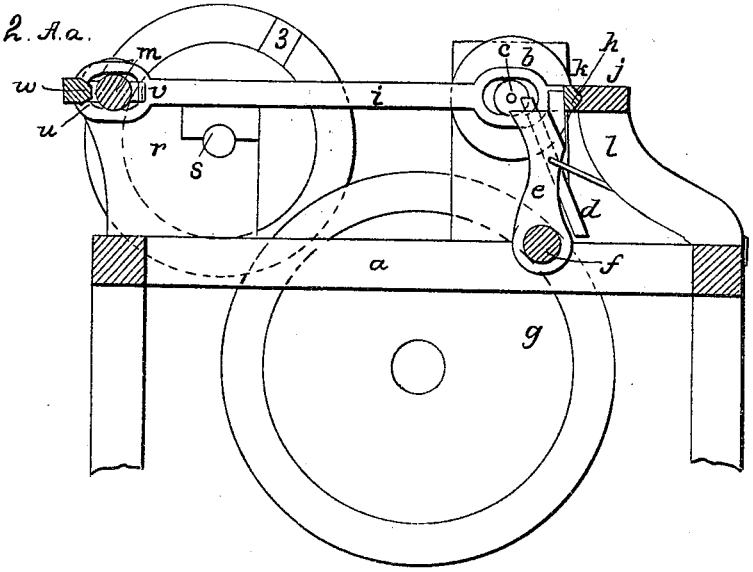

Figure 1 is a plan, and Fig. 2 a cross vertical section, taken at the line A *a* of Fig. 1.

The same letters indicate like parts in the two figures.

In the methods heretofore practiced of threading pointed wood-screws either several cuts must be made by the threading-chaser and before the threading operation begins along the cylindrical part of the shank, to remove the surplus material at the end of the blank to give the required form to the point of the screw, which is a waste of time in the entire operation, or at the first threading-cut the cutter must cut too rank to remove this surplus material, which frequently breaks the shank of the blank and always strains it, or else the blank must be previously milled in a separate machine or milled in the threading-machine by a separate cutter combined therewith, which, after milling the point, moves out of the way to permit the threading-chaser to chase the thread.

The object of my invention is to avoid all the objections to the above method of threading pointed screws by dividing the amount of material to be cut away to form the point, equally, or nearly so, among all the cuts; and, to this end—

The nature of my invention consists in giving to the mold, (or its equivalent,) which guides the threading chaser or cutter to form the screw with a point, an additional motion, so that the shaping motion which it imparts to the chaser to give the pointed form shall be gradual or divided among several cutting motions instead of making all the succeeding cuts parallel to the first. In this way the form can be given to the point by the same number of cuts as are required simply to chase the thread along the shank and without undue strain on the metal.

In the accompanying drawings, which represent so much of a machine for threading wood-screws as is deemed necessary to show the application of my present improvement, *a* represents the frame, and *b* the mandrel to carry and rotate the blank *c*, which is assumed to be held in suitable gripping-jaws. The chaser *d*, mounted on a tool-post *e*, attached to a sliding rock-shaft *f*, which has a longitudinal motion given by the cam *g* to determine the pitch of the thread, is guided toward the axis of the blank to give the required shape to the shank and point by means of a mold *h*, whose horizontal section corresponds with the form to be given to the shank of the screw. This mold is held in the end of a horizontal frame *i* and fitted to a socket in the inside of the end piece *j* thereof, on which it can slide and rock. It is provided with a spring *k*, the tension of which tends constantly to hold it in the position represented in the drawings. The frame *i* slides endwise in the two standards *l l* of the main frame, and the side pieces at the other end have elongated holes, so that they embrace and can slide on a sliding bar *m*. Along the inside face of one of the side pieces of this frame there is a wedge-bar *n*, which slides thereon endwise. It is wedge-formed at one end, as at *o*, the face of the wedge bearing against the outer end of the mold, so that when the said bar is pushed in the direction of the arrow the mold is pushed toward the mandrel and in a line parallel with its axis, and when the bar is drawn in the reverse direction the mold is drawn back by the tension of its spring. The frame and wedge-bar are connected by a spring *p*, the tension of which tends constantly to pull the outer end of the frame against the sliding bar *m* and the wedge-bar *n* away from the mold and against the said sliding bar *m*, so that this sliding bar is always gripped by the tension of this spring between the end of the frame *i* and the end of the wedge-bar *m*. The sliding bar *m* above described is kept by the tension of a spring *q* against the face of a cam *r* on the shaft *s*, which makes one revolution for each complete operation of the machine, and the face of this cam is divided into as many sections as there are to be separate cuts in the complete threading of a screw—one division for each cut. All the divisions are parallel but on different planes, connected by inclined planes 1 2 3, &c., so that during the rotation the passage of each inclined plane pushes the sliding bar *m* against the tension of its spring a given and required distance, and at the end of the revolution the spring is drawn back by its spring to begin again. This sliding bar *m* carries two wedge-cams *u* and *v* on opposite sides. The one *u* acts on a boss *w* on the end piece of the frame to move the said frame *i* and the mold which it carries against the cutter-stock to make the said cutter or chaser approach nearer to the axis of the blank for each succeeding cut, and the other *v* to act against the end of the wedge-bar that by its wedge-formed end it may, at each succeeding cut, force the mold endwise toward the end of the blank, that that part of the mold which guides the chaser around the end of the point may, by each succeeding operation, cut away more of the point until the entire form is given to the point, thus cutting away a portion at each cut instead of cutting away the whole at the first cut, as heretofore practiced.

I have not represented, nor do I deem it necessary to describe, the mode of relieving the cutter at the end of each cut to permit it to be drawn back for repeating the operation, as this is well known to persons conversant with machinery for threading wood-screws.

I do not wish to limit myself to the cutting away of the surplus material by all the threading-cuts, as it may be done, although less perfectly, by two or more cuts, the last cuts being parallel to some of the preceding; but I deem it best to divide this equally, or nearly so, among all the cuts.

It will be obvious that my invention can be applied to other machines other than the one herein described for threading pointed wood-screws, and also that the mode of application of the principle or character of my invention may be varied by the substitution of equivalent means, and therefore I do not limit myself to the mode herein described so long as the same end is attained by similar means.

What I claim as my invention, and desire to secure by Letters Patent, is—

Giving to the mold or former or its equivalent, motion, substantially as specified, whereby the cutting away of the metal at the end of the shank is divided among several threading motions, instead of being cut away at the first threading motion, as heretofore practiced.

THOS. J. SLOAN.

Witnesses:
CAUSTEN BROWNE,
JAS. M. BROWN.